United States Patent [19]

Manabe

[11] 4,116,143
[45] Sep. 26, 1978

[54] PROGRAMMING SYSTEMS FOR AUTOMATIC SEWING MACHINES

[75] Inventor: Takao Manabe, Shizuoka, Japan

[73] Assignee: Toshiba Kikai Kabushiki Kaisha, Tokyo, Japan

[21] Appl. No.: 782,232

[22] Filed: Mar. 28, 1977

[30] Foreign Application Priority Data

Mar. 31, 1976 [JP] Japan .................................. 51-35524

[51] Int. Cl.² ............................................. D05B 19/00
[52] U.S. Cl. ................................ 112/121.11; 318/568
[58] Field of Search ...................... 112/121.11, 121.12; 318/568, 567, 569

[56] References Cited

U.S. PATENT DOCUMENTS

| | | | |
|---|---|---|---|
| 3,373,267 | 3/1968 | Swann | 318/568 X |
| 3,459,145 | 8/1969 | Ramsey et al. | 112/121.11 |
| 3,559,021 | 1/1971 | Bingham, Jr. | 318/568 |
| 3,619,755 | 11/1971 | Munro et al. | 318/568 |

Primary Examiner—Peter Nerbun
Attorney, Agent, or Firm—Koda and Androlia

[57] ABSTRACT

In a programming system for an automatic sewing machine wherein a sewing command program for producing sewing machine control signals is stored in the addressable locations of a memory device, the program is prepared by using a relatively simple logical operation circuits instead of using an electronic computer.

6 Claims, 17 Drawing Figures

FIG. 13

| MEMORY NO | 1 | | | | 2 | | | CORRESPONDING PORTION |
|---|---|---|---|---|---|---|---|---|
| TYPE OF DATA | TYPE OF CONTROL | CONTROL SIGNAL | X SIGN | X DATA OR OPERATION NUMBER | Y SIGN | Y DATA OR OPERATION NUMBER | | |
| BIT / ADDRESS NO | 7 6 | 5 4 3 2 | 1 | 0 | 7 6 5 4 | 3 2 1 0 | | |
| 0 | 1 1 | 0 0 0 0 | 0 | 0 0 0 0 | 0 0 0 0 | 0 0 0 0 | | |
| 1 | 0 1 | 0 0 1 0 | 0 | 0 0 0 0 | 0 0 0 0 | 0 1 1 1 | | ① |
| 2 | 0 0 | 0 0 1 0 | 0 | 0 0 0 0 | 1 1 0 1 | 0 0 1 0 | | |
| 3 | 1 0 | 0 0 0 0 | 0 | 0 0 0 0 | 0 0 0 0 | 0 0 0 0 | | A |
| 4 | 0 0 | 1 0 0 0 | 0 | 0 0 0 0 | 0 0 0 0 | 0 0 0 0 | | |
| 5 | 0 0 | 1 0 0 0 | 0 | 0 1 0 1 | 1 1 0 0 | 1 0 0 1 | | |
| 6 | 0 1 | 1 0 0 0 | 0 | 0 0 0 0 | 0 0 0 0 | 0 0 1 0 | | |
| 7 | 0 0 | 1 0 0 0 | 0 | 0 1 0 1 | 1 1 1 0 | 0 0 0 0 | | ② |
| 8 | 0 0 | 1 0 0 0 | 0 | 0 1 0 1 | 1 1 1 0 | 0 1 0 1 | | |
| 9 | 0 1 | 1 0 0 0 | 0 | 0 0 0 0 | 0 0 0 0 | 0 0 1 0 | | |
| 10 | 0 0 | 1 0 0 0 | 0 | 0 1 0 1 | 1 1 0 0 | 0 0 0 0 | | |
| 11 | 0 1 | 1 0 0 0 | 0 | 0 0 0 0 | 0 0 0 0 | 0 0 1 0 | | ③ |
| 12 | 0 0 | 1 0 0 0 | 1 | 1 0 1 0 | 0 0 0 0 | 0 0 0 0 | | |
| 13 | 0 1 | 1 0 0 0 | 0 | 0 0 0 0 | 0 0 0 0 | 0 1 1 0 | | ④ |
| 14 | 0 0 | 1 0 0 0 | 0 | 0 0 0 0 | 0 0 0 0 | 1 0 1 0 | | |
| 15 | 0 0 | 1 0 0 0 | 0 | 0 0 0 1 | 0 1 0 1 | 1 0 1 0 | | |
| 16 | 0 0 | 1 0 0 0 | 0 | 0 1 0 0 | 0 1 0 0 | 1 0 0 1 | | |
| 17 | 0 0 | 1 0 0 0 | 0 | 0 1 1 0 | 0 1 0 0 | 1 0 0 0 | | ⑤ |
| 18 | 0 0 | 1 0 0 0 | 0 | 1 0 0 0 | 0 0 0 0 | 0 1 1 1 | | |
| 19 | 0 0 | 1 0 0 0 | 0 | 1 0 1 1 | 0 0 1 0 | 0 1 0 1 | | |
| 20 | 0 0 | 1 0 0 0 | 0 | 1 0 0 1 | 1 0 0 1 | 0 0 0 1 | | |
| 21 | 0 0 | 1 0 0 0 | 0 | 1 0 0 1 | 1 0 0 1 | 0 0 1 0 | | |
| 22 | 0 0 | 1 0 0 0 | 0 | 1 0 1 0 | 1 1 0 0 | 0 0 0 1 | | |
| 23 | 0 0 | 1 0 0 0 | 0 | 1 0 1 0 | 1 1 0 0 | 0 0 1 0 | | ⑥ |
| 24 | 0 0 | 1 0 0 0 | 0 | 1 0 1 0 | 1 1 0 0 | 0 0 0 1 | | |
| 25 | 0 0 | 1 0 0 0 | 0 | 1 1 0 0 | 1 1 0 0 | 0 0 1 0 | | |
| 26 | 0 1 | 1 0 0 0 | 0 | 0 0 0 0 | 0 0 0 0 | 0 0 1 0 | | ⑦ |
| 27 | 0 0 | 1 0 0 0 | 0 | 0 0 0 0 | 1 1 1 0 | 1 0 1 0 | | |
| 28 | 0 1 | 0 0 1 0 | 0 | 0 0 0 0 | 0 0 0 0 | 0 0 1 1 | | ⑧ |
| 29 | 0 0 | 0 0 1 0 | 0 | 0 0 0 0 | 1 1 1 0 | 1 0 1 0 | | |
| 30 | 0 0 | 1 0 0 0 | 0 | 0 0 0 0 | 0 0 0 0 | 0 0 0 0 | | |
| 31 | 0 0 | 1 0 0 0 | 0 | 0 1 1 1 | 1 1 0 0 | 1 0 0 0 | | |
| 32 | 0 0 | 1 0 0 0 | 0 | 0 1 0 1 | 1 1 0 0 | 1 0 0 0 | | |
| 33 | 0 0 | 1 0 0 0 | 0 | 0 0 0 1 | 1 1 1 0 | 1 0 1 0 | | ⑨ |
| 34 | 0 0 | 1 0 0 0 | 1 | 0 0 1 0 | 1 1 0 1 | 1 0 1 0 | | |
| 35 | 0 0 | 1 0 0 0 | 1 | 0 1 1 0 | 1 1 0 1 | 1 0 0 1 | | |
| 36 | 0 0 | 1 0 0 0 | 1 | 0 1 0 1 | 1 1 0 1 | 1 1 1 1 | | |
| 37 | 0 1 | 1 0 0 0 | 0 | 0 0 0 0 | 0 0 0 0 | 0 1 1 1 | | ⑩ |
| 38 | 0 0 | 1 0 0 0 | 1 | 0 1 0 1 | 1 0 0 0 | 0 0 0 0 | | |
| 39 | 0 1 | 0 1 1 0 | 0 | 0 0 0 0 | 0 0 0 0 | 1 0 0 0 | | ⑪ |
| 40 | 0 0 | 0 0 1 0 | 1 | 1 0 0 0 | 0 1 1 1 | 1 1 1 1 | | |
| 41 | 0 0 | 0 0 1 0 | 1 | 0 1 1 0 | 0 1 1 0 | 1 1 0 0 | | |
| 42 | 1 1 | 0 0 1 0 | 0 | 0 0 0 0 | 0 0 0 0 | 0 0 0 0 | | STP |

FIG. 14

| MEMORY NO | BIT | $D_{11} \sim D_{28}$ | CONTENT |
|---|---|---|---|
| 1 | 7, 6 | $D_{18}, D_{17}$ | TYPE OF CONTROL |
| 1 | 5 | $D_{16}$ | START |
| 1 | 4 | $D_{15}$ | THREAD CUT |
| 1 | 3 | $D_{14}$ | STOP AT UPPER DEAD CENTER |
| 1 | 2 | $D_{13}$ | STOP AT LOWER DEAD CENTER |
| 1 | 1 | $D_{12}$ | ⊕,⊖ IN X DIRECTION |
| 1 | 0 | $D_{11}$ | AMOUNT OF MOVEMENT IN X DIRECTION |
| 2 | 7 | $D_{28}$ | |
| 2 | 6 | $D_{27}$ | |
| 2 | 5 | $D_{26}$ | |
| 2 | 4 | $D_{25}$ | ⊕,⊖ IN Y DIRECTION |
| 2 | 3 | $D_{24}$ | AMOUNT OF MOVEMENT IN Y DIRECTION |
| 2 | 2 | $D_{23}$ | |
| 2 | 1 | $D_{22}$ | |
| 2 | 0 | $D_{21}$ | |

| MEMORY | TYPE OF CONTROL | CONTROL SIGNAL | X SIGN | X DATA | Y SIGN | Y DATA | OPERATION NUMBER DATA |
|---|---|---|---|---|---|---|---|
| | MEMORY 1 | | | | MEMORY 2 | | MEMORY 3 |

| BIT ADDRESS NO. | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 1 | 0 | 0 | 0 | 0 | 0 | 0 | 1 | 1 | 1 | 1 | 0 | 0 | 1 | 0 | 0 | 0 | 0 | 0 | 0 | 0 | 0 |
| 3 | 0 | 0 | 1 | 0 | 0 | 0 | 0 | 0 | 0 | 1 | 1 | 1 | 1 | 0 | 0 | 1 | 0 | 0 | 0 | 0 | 0 | 1 | 0 | 0 |
| 4 | 0 | 0 | 0 | 0 | 0 | 0 | 0 | 0 | 0 | 0 | 1 | 0 | 1 | 0 | 1 | 1 | 1 | 0 | 0 | 0 | 0 | 0 | 0 | 0 |
| 5 | 0 | 0 | 1 | 0 | 0 | 0 | 1 | 1 | 1 | 0 | 1 | 0 | 0 | 0 | 0 | 0 | 0 | 0 | 0 | 0 | 0 | 0 | 0 | 0 |
| 6 | 0 | 0 | 1 | 0 | 0 | 0 | 1 | 1 | 1 | 0 | 1 | 0 | 0 | 0 | 0 | 0 | 0 | 0 | 0 | 0 | 0 | 0 | 0 | 1 |
| 7 | 0 | 0 | 1 | 0 | 0 | 0 | 0 | 0 | 0 | 0 | 0 | 0 | 0 | 1 | 0 | 1 | 0 | 0 | 0 | 0 | 0 | 0 | 0 | 0 |
| 8 | 0 | 0 | 1 | 0 | 0 | 0 | 0 | 0 | 0 | 0 | 0 | 0 | 0 | 1 | 0 | 1 | 0 | 0 | 0 | 0 | 0 | 1 | 0 | 1 |
| 9 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

PROGRAMMING SYSTEMS FOR AUTOMATIC SEWING MACHINES

BACKGROUND OF THE INVENTION

This invention relates to a programming apparatus of an automatic sewing machine which is not expensive and can automatically sew a predetermined sewing pattern by memorizing it on a non-volatile memory medium.

Recently, an automatic sewing machine has been developed in which a predetermined sewing pattern of the collar, pocket opening and cuff of a shirt is memorized in a non-volatile memory medium, for example a read only memory device (ROM) thereby improving the sewing efficiency and assuring uniform quality of the products.

However, the operation for storing in such a memory device a program for executing predetermined sewing steps is a troublesome operation. More particularly, it is necessary to sequentially calculate the rectangular coordinates of a needle position along a sewing pattern as well as the spacing between needle lowering positions, compare the result of calculation with the length of a sewing pitch and to prepare a program sheet based on the result of calculation and comparison.

We have already proposed an improved programming system according to which writing of a sewing program with a predetermined sewing program is made possible by merely tracing a sewing pattern curve with a stylus. This system eliminates the program sheet and can store in a memory device a sewing program corresponding to a predetermined sewing pattern by means of a memory writing device.

However, it will be discussed later in more detail this programming system requires use a program processor capable of performing a number of logical operations such as a micro-computer, for example. Accordingly, the programming system is expensive.

SUMMARY OF THE INVENTION

Accordingly, it is an object of this invention to provide an improved programming system for an automatic sewing machine capable of preparing any desired sewing program by using a simple logical operation circuit instead of using an expensive electronic computer.

According to this invention, there is provided a programming system for an automatic sewing machine of the type comprising a memory device provided with a plurality of addresses corresponding to respective steps of the sewing operation of the sewing machine, the addresses being used to store sewing machine driving signals corresponding to respective addresses and means for storing a sewing command program in the memory device, characterized in that there are provided a sewing pattern sheet provided with marks corresponding to needle lowering positions of a predetermined sewing profile; a coordinate reader including a stylus movable on the sheet to a selected mark, and an X axis and a Y axis counters for representing the X and Y coordinates of the stylus at the selected mark; an X axis buffer register and a Y axis buffer register; switch means for producing a reset signal which is used to set the contents of the X and Y axis counters respectively in the X and Y axis buffer registers and to reset the X and Y axis counters when the stylus is positioned on the selected mark, the X and Y axis buffer registers holding the set values until the stylus is moved to a succeeding mark; an operation number counter responsive to a straight line signal which is given when successive marks of the sewing pattern lie along a straight line for counting the number of the marks along one of X and Y coordinates in which the displacement of a sewing pattern with respect to the X and Y coordinates is large; a control panel for producing a signal regarding the type of the sewing machine control and a sewing machine control signal; an address counter which advances its count in response to a reset signal for the operation number counter, the signal regarding the type of the control and the sewing machine control signal; and a memory writer for storing the signal regarding the type of the sewing machine control, the sewing machine control signal and bit values of the X and Y axis buffer registers and of the operation number counter in a memory region corresponding to an address in the memory device designated by the address counter.

BRIEF DESCRIPTION OF THE DRAWINGS

In the accompanying drawings:

FIG. 13 shows a sewing program corresponding to the pattern shown in FIG. 12;

FIG. 14 is a table showing the relationship between the output signals described in FIG. 11 and the memory ranges of two memory devices;

DESCRIPTION OF THE PREFERRED EMBODIMENTS

Figure 1:
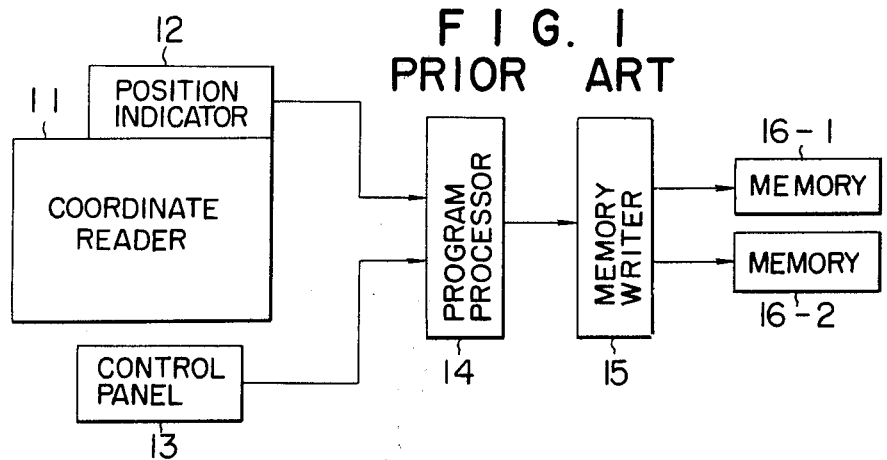
FIG. 1 is a block diagram showing a prior art programming system provided with a micro-computer.

Before describing the invention, the prior art programming system mentioned above will firstly be described in detail with reference to FIGS. 1 to 4. The programming system shown in FIG. 1 comprises a coordinate reader 11, a position indicator 12, a control panel 13, a program processor 14, a memory writer 15 and two memory devices 16-1 and 16-2. The coordinate reader 11 comprises a magnifying lens 101 mounted on a movable member 102 which is movable in Y direction (hereinafter called Y member) along a movable member 103 which is movable in X direction (hereinafter termed X member). The opposite ends of piano wires 112 and 113 are wrapped about pulleys 107, 108, 109 and 110 respectively and the intermediate points of the piano wires are secured to the Y member 102 and X member 103, respectively. Pulleys 107 and 110 are driven by rotary encoders 104 and 105 respectively. When the magnifying lens 101 is positioned at any position of a table 111, the displacement of the lens is counted and displayed by X axis and Y axis counters, not shown, on a position indicator 12 through encoders 104 and 105. A sewing pattern curve PTRN is mounted on the table 111 of the coordinate reader and the cross point of cross hairs 122 of the lens is moved along the sewing pattern curve. The sewing pitch is set to 2 mm by selecting "20", for example, by a two digit sum wheel switch 132 on the control panel 13. The X and Y coordinate values of the cross point are successively applied to the program processor 14 from the position indicator 12 for calculating the distance between a preceding needle position and the present position of the cross point thereby judging that whether the distance is equal to 2 mm or not. When the distance is equal to 2 mm the distance coresponding to the coordinate position is converted into a number of pulses utilized to drive the head of a sewing machine (not shown) in the X or Y direction and the pulses are applied to the memory writer 15. The operation described above is repeated to sew the sewing pattern. To this end, the program processor 14 is provided with a logical operation unit, for example a micro-computer. For this reason, the cost of the program processor 14 amounts to $\frac{1}{2}$ to $\frac{1}{3}$ of the total cost.

Although the system described above can write a program into the memory device with a high efficiency, the present state of the sewing industry has not yet reached a stage wherein programming of the memory device can be made by an independent company. Accordingly, a low cost programming system that can be readily used is desirable rather than a high efficiency and expensive programming system.

According to this invention a low cost programming system of an automatic sewing machine is provided wherein a simple logical operation circuit is substituted for a relatively expensive electronic computer.

A preferred embodiment of this invention will now be described with reference to FIGS. 5 through 16.

Figure 5:
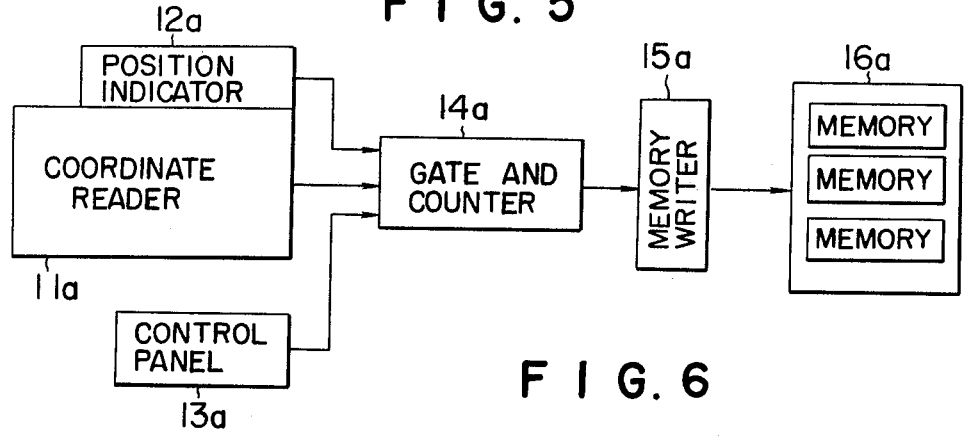
FIG. 5 is a block diagram showing the programming system embodying the invention.

As shown in FIG. 5, the programming system of this invention comprises a coordinate reader 11a, a position indicator 12a associated with the coordinate reader, a control panel 13a, a combined gate circuit and counter 14a, a memory writer 15a and a plurality of memory devices 16a.

Figure 6:
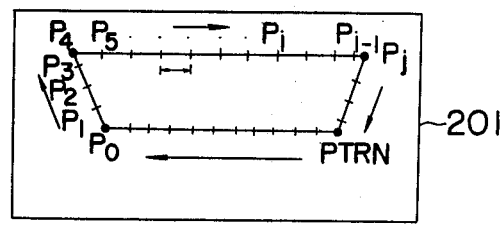
FIG. 6 shows a sewing pattern of the collar of a shirt.

FIG. 6 shows a sewing pattern formed on a sheet material 201, for example the sewing pattern of the collar of a shirt. The needle lowering positions along the pattern are shown by successive positions $P_o$, $P_1$, $P_2$ ... $P_j$, wherein point $P_o$ designates the starting position. Although the method of depicting the pattern and the material of the sheet are not important to this invention, a brief description is believed necessary in connection with the stylus which will be described hereinafter with reference to FIG. 7. For example, a sheet of white paper is used as sheet 201 and the sheet is perforated along a pattern curve PTRN by using the sewing needle. Points $P_o$ through $P_j$ show such perforations. The curve PTRN may be depicted beforehand or a skilled operator may directly perforate the sheet by operating a sewing machine. Usually, the distance between the centers of adjacent perforations is made to be equal to a constant sewing pitch $l$ by adjusting the feed of the sewing machine. Accordingly, there may be a case wherein the distance between the last point $P_j$ and a preceding point $P_{j-l}$ is different from the definite sewing pitch $l$. The curve PTRN may be an actual size or may be suitably enlarged, and the points $P_o$ through $P_j$ may be depicted on a white sheet with black ink. Alternatively, the surface of the sheet 201 may be coated with a magnetic material in which case positions corresponding to the points $P_o$ ... $P_j$ are magnetized.

Figure 2:
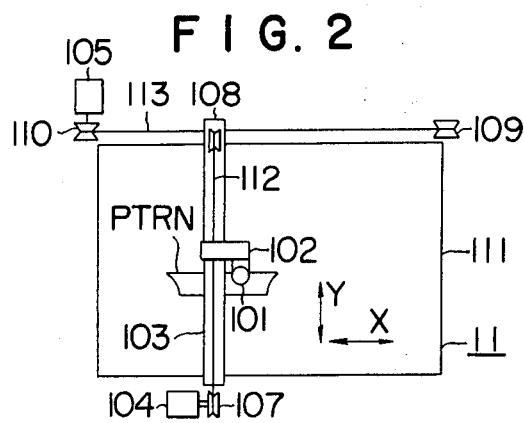
FIG. 2 is plan view of a coordinate reader.
Figure 3:
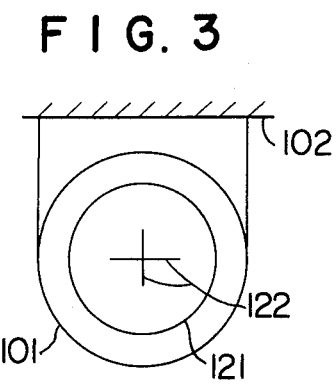
FIG. 3 is an enlarged view of the magnifying lens shown in FIG. 2.
Figure 4:
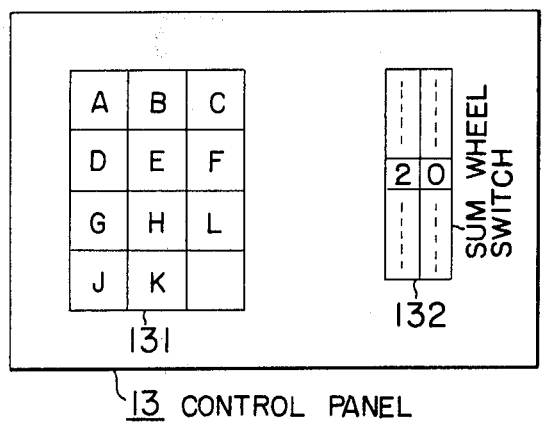
FIG. 4 shows the detail of the control panel shown in FIG. 1.
Figure 7:
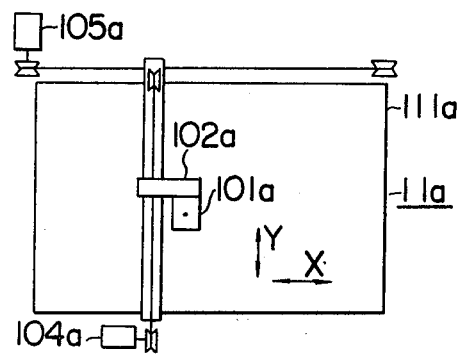
FIG. 7 is a plan view showing the coordinate reader utilized in this invention.
Figure 8:
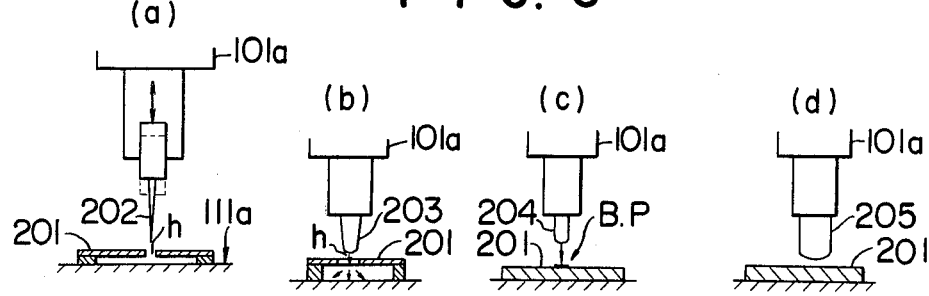
FIGS. 8a through 8d are side views of various types of the stylus and sheet material.

The coordinate reader shown in FIG. 7 is generally identical to that shown in FIG. 2 except that a stylus holder 101a corresponding to the magnifying lens takes a different form depending upon the construction of the sheet 201 and the method of detecting the positions.

In the example of FIG. 8a, a perforation h is formed through a sheet 201 by means of a sewing needle, not shown, and a stylus holder 101a holding a needle like member 202, for example a sewing needle is mounted above the perforation h. In this case, the needle like member 202 is reciprocated through the perforation so as to produce an output signal from a switch circuit to be described later. This reciprocating motion can be effected by depressing a pedal or a push button provided for the coordinate reader when the operator confirms that the needle like member or stylus 202 is positioned just above the perforation h.

In the case shown in FIG. 8b, where a perforation h is formed through a sheet 201, a pneumatic micrometer nozzle 203 is used. According to this method, the operation for approaching the nozzle holder 101a to the perforation can be simplified.

In the case shown in FIG. 8c, a black spot BP is applied to the position corresponding to the perforation. In this case a photo-detector 204 which detects reflected light can be used for approaching the holder 101a.

In the case shown in FIG. 8d, a magnetic head 205 for detecting a magnetized position is used for approaching the holder 101a.

For the sake of simplicity, these perforations, black spots and magnetized portions are simply called "marks".

In the case of FIGS. 8b, 8c and 8d the positioning of the stylus can be made readily by displaying with an analog quantity the fact that the detected physical quantity has a predetermined value. Since the actual sewing pitch is small, for example only 2mm, if the spacing between the marks on the sheet is increased several times, the operation can be performed more readily. Where such a magnified scale is used, the values read by the coordinate reader also increase so that it is necessary to increase the unit of the count of the X and Y axis counters. In this example, for the sake of description, it is herein assumed that the unit of the counters is set to be 0.2 mm which is equal to the width of the feed pulse FIG. 10 illustrates one example of the circuit of the block diagram shown in FIG. 9. FIG. 10 shows a detailed gate circuit for applying a counting signal to the operation number counter 328, but there is not shown the circuit including a signal circuit and its operating timing for transferring contents of the operation number counter 328 and those of X axis and Y axis buffer registers 304 and 305 to the memory writer 15a. The address counter 301 is also not shown because it is common to FIG. 17.

Figure 9:
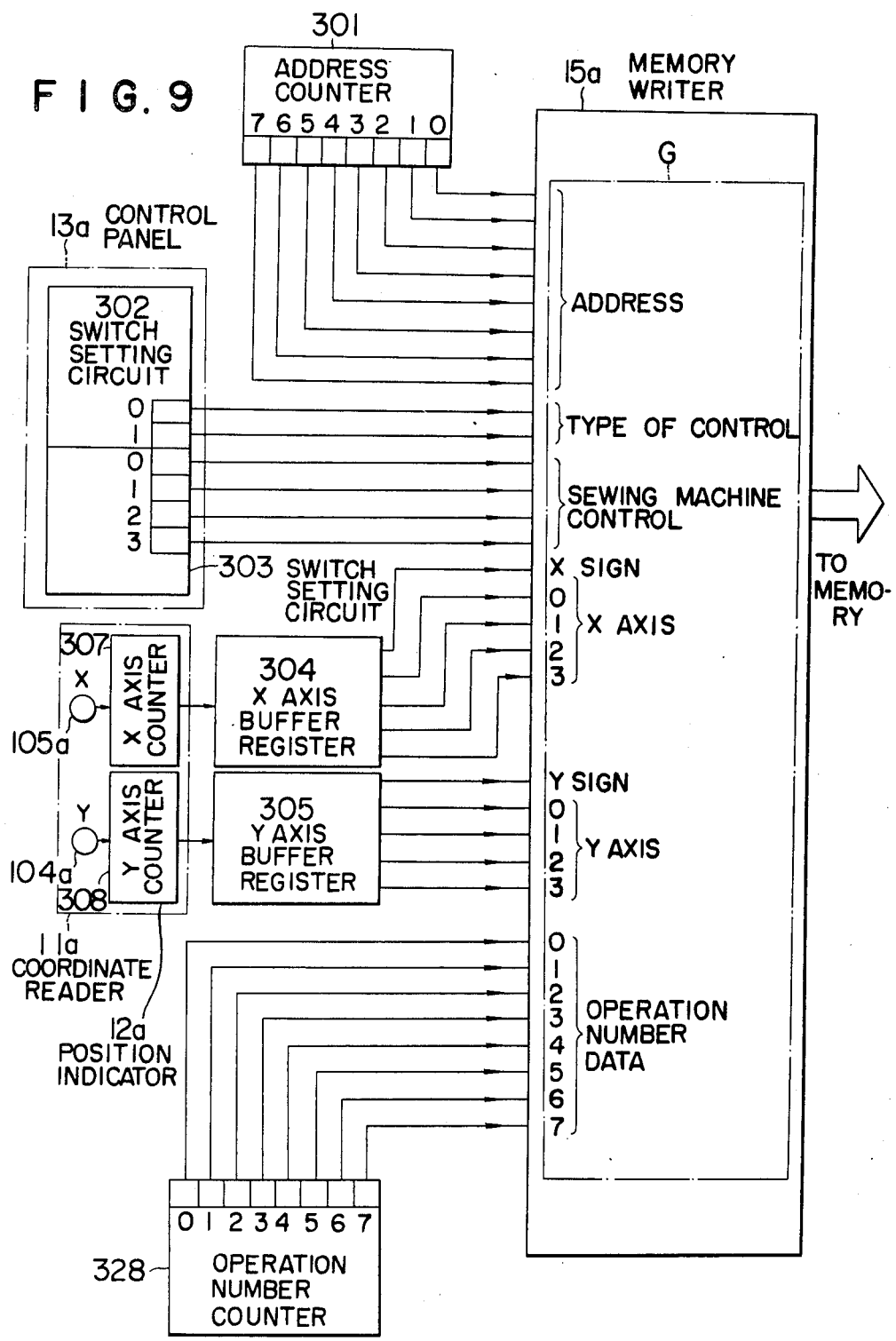
FIG. 9 is a block diagram showing the connection between an address counter, control panel, buffer registers, an operation number counter and a memory writer.
Figure 10:
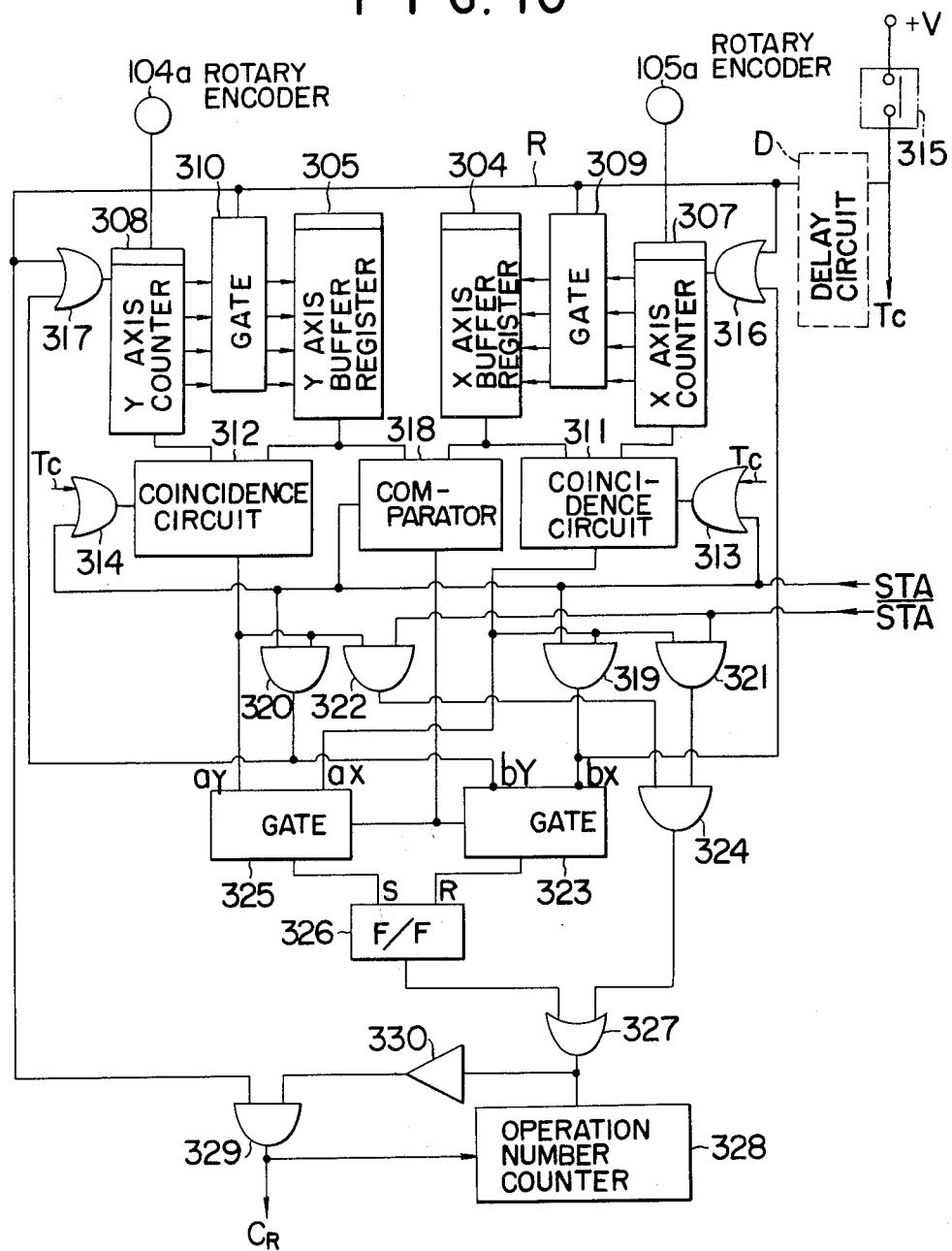
FIG. 10 is a block diagram showing the connection between various circuit elements of one embodiment of the programming system of this invention.

In the block diagram shown in FIG. 9 there are provided an address counter 301 which is used to designate an address when data is written in the memory device, a two bit switch setting circuit 302 representing the type of the sewing machine control, and a four bit switch setting circuit 303 which provides a control signal to the sewing machine. Switch setting circuits 302 and 303 constitute the control panel 13a. The coordinate reader 11a includes rotary encoders 104a and 105a which apply incremental coordinate values to the X axis and Y axis counters of the position indicator 12a. A signal bit representing positive or negative sense of the incremental value is added to the coordinate value. As above described, the unit of the count of the X axis and Y axis counters is made to be equal to the width of a pulse supplied to a pulse motor for feeding the sewing machine. X axis and Y axis buffer registers 304 and 305 are provided. There is also provided an operation counter 328 which comprises 8 bits and designates the number of sewing operations when the needle lowering positions are on the same straight line and when the same sewing pitch is maintained.

The memory writer 15a comprises a gate circuit G which is connected to the outputs of the address counter, control panel, X and Y axis buffer registers and operation number counter for writing these output signals in the memory device 16a shown in FIG. 5 at with predetermined timing.

In a block diagram shown in FIG. 10, the rotary encoders 104a and 105a of the coordinate reader 11a apply the incremental value of the stylus at each mark, that is the incremental value of the present mark with reference to a preceding mark to the X axis and Y axis counters 307 and 308.

Counters 307 and 308 are reset at each mark position when OR gate circuits 316 and 317 are enabled for transferring the bit signals of the counters 307 and 308 to X axis and Y axis buffer registers 304 and 305, respectively. The OR gate circuits are enabled when the operator depresses a push button during the reciprocating motion of the stylus in the case of FIG. 8a, while in the cases of FIGS. 8b, 8c and 8d, when the operator depresses a push button after he has confirmed that the values detected by the stylus heads 203, 204 and 205 have reached predetermined values. That is, depression of the push button described above, corresponds to the closure of the switch circuit 315 shown in FIG. 10. The timing signal Tc is produced when the switch circuit 315 is closed and the signal Tc is applied to the delay circuit D. Coincidence circuits 311 and 312 are provided for producing coincidence and noncoincidence signals when the contents of the counters 307 and 308, and the contents of the buffer registers 304 and 305 coincide or not. The timing of comparing the coincidence is given by a signal Tc passing through OR gate circuits 313 and 314. The timing signal Tc is coupled to OR gate circuits 313 and 314 a little earlier than a reset signal R which is produced from the signal Tc by the delay circuit D. To this end, a delay circuit D is provided between switch circuit 315 and the OR gate circuits 316 and 317. Alternatively, a plurality of timing pulses may be produced by switch 315 and an earlier one is used as signal Tc and a later one as the reset signal R.

Figure 12:
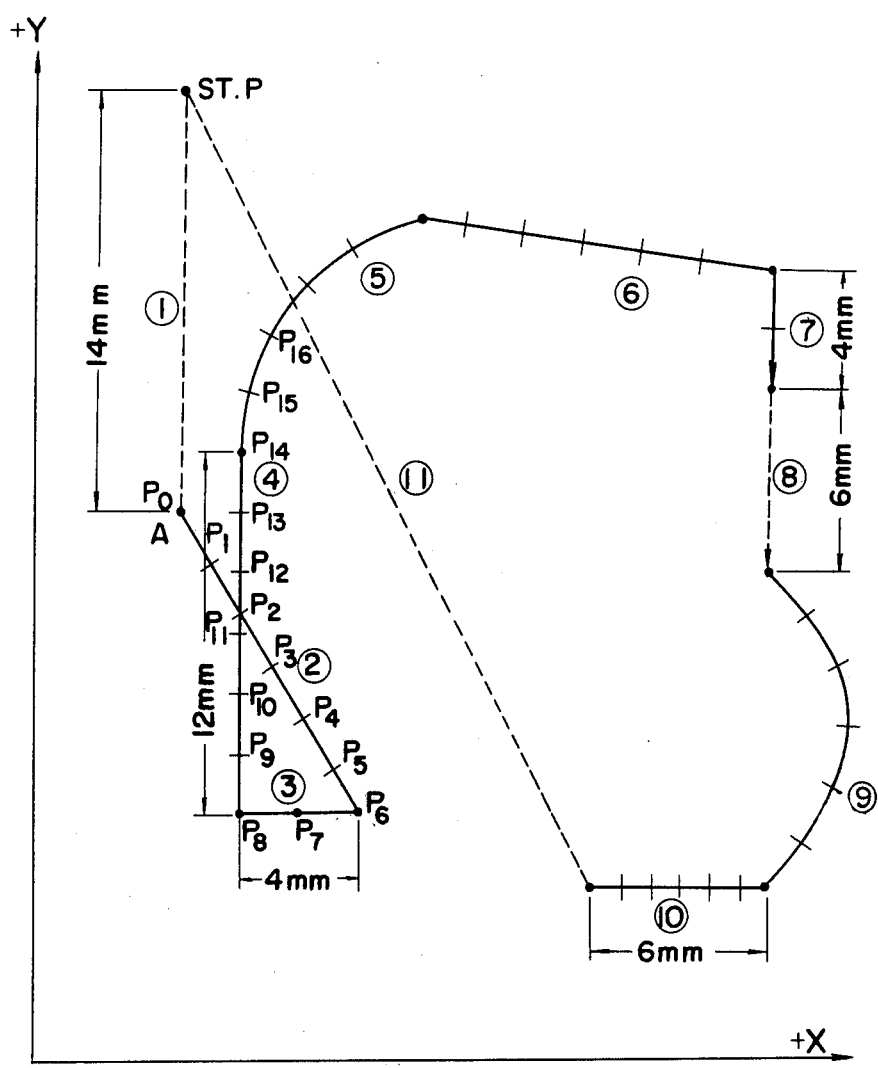
FIG. 12 shows a typical sewing pattern.

A comparator 318 is provided for comparing the values of the buffer registers 304 and 305, when both coincidence circuits 311 and 312 are detected under the condition of straight line signal STA = 1. STA represents a signal applied by the judgement of the operator when a straight portion of the sewing pattern is encountered. The straight line signal STA is applied to OR gate circuits 313, 314, comparator 318 and AND gate circuits 319 and 320. $\overline{STA}$ represents a timing signal which is produced by a timing circuit, not shown, which is energized by the first signal Tc after the straight line signal STA has been produced. The timing signal $\overline{STA}$ is applied to AND gate circuits 321 and 322. The straight line signal STA and the output of the coincidence circuit 311 are applied to the inputs of an AND gate circuit 319 whose output is applied to an X, Y gate circuit 323 and the OR gate circuit 316. An AND gate circuit 320 is applied with the straight line signal STA and the output of the coincidence circuit 312, and its output is applied to the XY gate circuit 323 and the OR gate circuit 317. Signals to be given to the OR gate circuits 317 and 318 from the AND gate circuits 319 and 320 are used for presetting the counters 307 and 308 even if the reset signal R from the switch circuit 315 is not applied to the counters 307 and 308 through the OR gate circuits 316 and 317 under the condition of straight line signal STA = 1. For this reason, operation number data can be obtained, without positioning the holder 101a on the intermediate marking points, but by merely positioning the holder 101a at the starting and final marking points on the straight line portion of the sewing pattern in a range in which the stitch pitch is equal. An AND gate circuit 321 is supplied with the timing signal $\overline{STA}$ and the output of the coincidence circuit 311 and its output is applied to one input of an AND gate circuit 324. The output of the AND gate circuit 324 finally becomes "1" when the both coincidence signals from the coincidence circuits 311 and 312 are applied to the AND gate circuits 321 and 322 under the condition of the straight line signal STA = 1, and the output is then applied through the OR gate circuit 327 to the operation number counter 328 to increase the content of the counter by +1. An AND gate circuit 322 is applied with the timing signal $\overline{STA}$ and the output of the coincidence circuit 312 and its output is applied to the other input of AND gate circuit 324. A gate circuit 325 is connected to receive the outputs of coincidence circuits 311 and 312, and a flip-flop circuit 326 is connected to receive the output of gate circuit 323 at the reset terminal and the output of the gate circuit 325 at the set terminal. A signal from the flip-flop circuit 326 is given, under the condition of the straight line signal STA = 1, for applying the number of needle lowering operations having equal sewing pitches on the straight line portion of the sewing pattern to the operation number counter 328, and by the command signal from the comparator 318 the gate circuits 323 and 325 select inut signals (signals aX, bX applied from the coincidence circuit 311 with respect to X coordinate signals aY and bY from the coincidence circuit 312 with respect to Y coordinate, see FIG. 10) to be applied to the gate circuits 323 and 325. Referring to FIG. 12, provided that coordinate axis data of the starting points $P_8$ and $P_9$ between the marking points $P_8$ and $P_{14}$ with equal sewing pitches is applied from the encorders 105a and 104a and the increments $\Delta X$ ($P_8$, $P_9$) and $\Delta Y$ ($P_8$, $P_9$) between the points $P_8$ and $P_9$ are registered to the registers 304 and 305, the straight line signal (STA = 1) is given. Then the comparator 318 compares the contents of the registers 304 and 305, and providing that $\Delta Y > \Delta X$, the comparator 318 operates in relation to Y coordinate with respect to the gate circuits 323 and 325 and commands so that only the coincidence signal aY from the coincidence circuit 312 is passed. Therefore, as is understood from FIG. 10, the only output pulse aY from the coincidence circuit 312 is applied as an input for the gate circuit 325 and the only output pulse bY from the AND gate circuit 320 is applied as an input for the gate circuit 323. Under these conditions, when the holder 101a moves to the point 14 to position the holder 101a at the point 14 (regardless of the intermediate points $P_{10}$, $P_{11}$, $P_{12}$ and $P_{13}$), the contents of the register 305 and the counter 308 are compared successively on the way of the movement on the holder and when the both contents are coincident, the counter 308 is reset and only the signal pulses aY and bY from the concidence circuit 312 and the AND gate circuit 320 pass the gate circuits 325 and 323, respectively, to the flip-flop circuit 326, thereby generating a counting signal. During this operation the inputs aX and bX to the gate circuits 325 and 323 regarding X coordinate are blocked. Further, it should be noted that the output pulse-form of the flip-flop circuit 326 is shaped by slightly delaying the output of the gate circuit 323 from that of the gate circuit 325. An AND gate circuit 329 is connected to receive the output of the OR gate circuit 327 via an inverter 330 and signal R for producing a signal $C_R$ which is used to reset the counter 328. As is clear from the foregoing description, under the condition of STA = 1 counting signal pulses are applied one by one to the operation number counter 328 and from the AND gate circuit 324 through the OR gate circuit 327, and this pulse application continues only in the case where the coincidence circuits 311 and 312 are in the coincident state at the respective marking points. Furthermore, under the condition of STA = 1, the operation number data is applied to the operation number counter 328 by positioning the stylus holder 101a at the starting, the next and the final marking positions on the straight line portion with equally spaced pitches, and in this case, since one coordinate axis data is designated by the comparator 318, when the holder 101a is moved to the final point, it is not necessary to strictly coincide the holder 101a with the profile straight line and accordingly, the holder 101a is moved easily and smoothly. Signal $C_R$ is also applied to the address counter 301 (see FIG. 9) via a gate circuit, not shown. This gate circuit is supplied with a two bit control signal representing the type of the control and a four bit sewing machine control signal from the control panel 13a thereby causing the address counter 301 to perform a counting operation in accordance with the variation in these input signals. The operation number counter 328, the address counter 301, X and Y axis counters 308 and 307, and X and Y axis buffer registers 304 and 305 are cleared by a clear signal generated by a clear signal generator, not shown.

Figure 11:
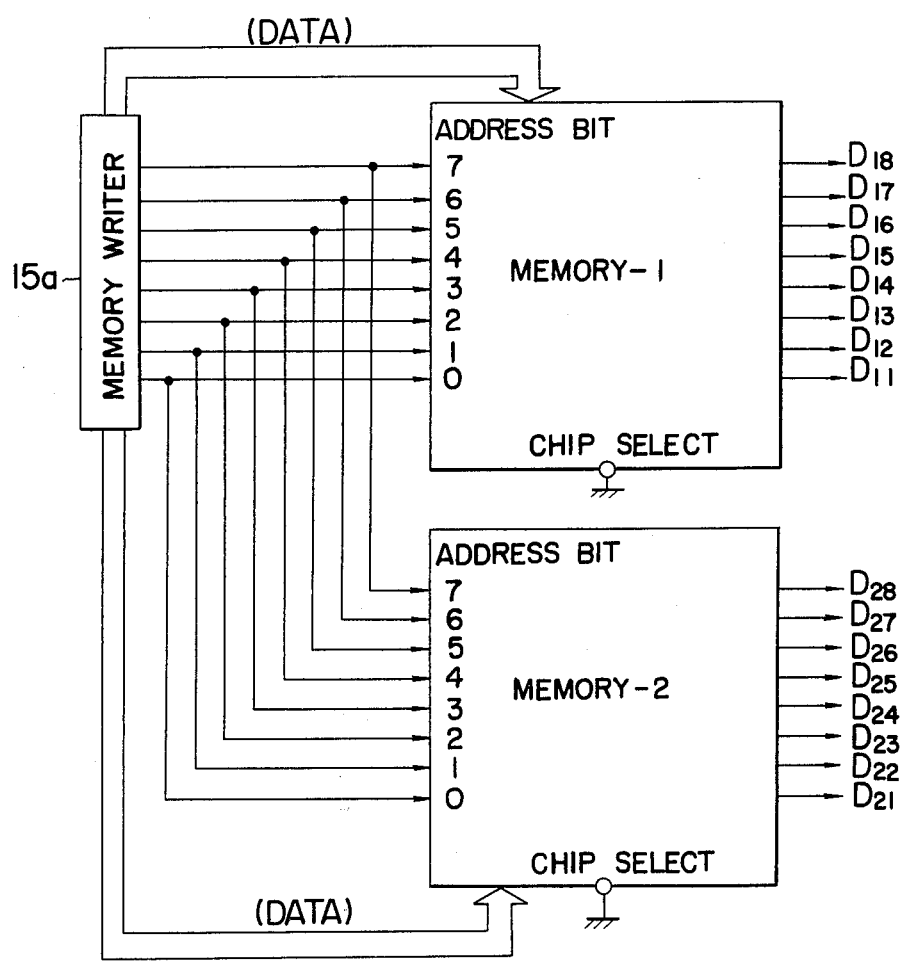
FIG. 11 is a block diagram showing the relationship between a memory writer and two memory devices.

FIG. 11 shows the connection between the memory writer 15a and two memory devices 1 and 2. Each memory device is provided with eight signal lines that designate the address bits.

When storing various data regarding the type of control, sewing machine control signal, X axis and Y axis increment, and number of operations in the memory devices two modes are used, in one mode all data are stored in a memory region corresponding to one address, for example Nth address, and in the other mode, the operation number data, for example, is stored in the next or (N+1) the address. In the former case the number of the memory devices must be increased in view of the capacity of the memory device while in the latter case, it is not necessary to increase the number of the memory devices. FIG. 13 shows one example of the latter case.

FIG. 12 shows one example of the sewing pattern in which at solid line portions 2 to 9 the sewing pitch is 2 mm, whereas at portion 10 the sewing pitch is 1mm. At a dotting line portion 8, sewing is not made. Crosspoints between short lines and solid lines show needle lowering positions, and ST.P shows a starting point.

FIG. 13 is a table showing the bit states of various data written into memory devices 1 and 2 in accordance with the sewing pattern shown in FIG. 12. The number of operation data can be set from 0 to 99. Tens order is formed by the four bits of X data while the least significant order by the four bits of the Y data.

FIG. 14 is a table showing the relationship between the memory region bits of the memory devices 1 and 2 and the output signals shown in FIG. 11. The type of the control and the sewing machine control signal shown in FIGS. 13 and 14 will be described in the following.

Type of Control

The data representing the type of control is stored in the sixth and seventh bit of the memory device 1. There are four types of control as follows.

1. Where the seventh and sixth bits are "0" and "0" (indicated by an arrow in FIG. 15) the following data are stored in the other bits.

The sewing machine control signal is stored in the fifth to second bits in the memory device 1. More particularly, fifth bit — sewing machine stop (shown by a symbol MST in FIG. 15)

fourth bit — thread cut (symbol CUT)

third bit — stop at the upper dead center (symbol UP-STP)

second bit — stop at the lower dead center first bit of the memory device 1 — direction of movement along X axis 0th bit of the memory device 1 - amount of movement and the seventh to fifth bits — along X axis of memory device 2 — (max. 15 pulses) or the number of needle lowerings fourth bit of memory device 1 — direction of movement along Y axis third to 0th bits of memory device 2 — amount of movement along Y axis or the number of needle lowerings.

2. Where the seventh and sixth bit positions are "0" and "1"

In this case, the number of needle lowerings is shown when the amounts of unit movements along X and Y axes are equal.

3. Where the seventh and sixth bits are "1" and "0" (symbol OP-STP shown in FIG. 15) This case means an optional stop of the movement 4. Where the seventh and sixth bits are "1" and "1" (symbol STP shown in FIG. 15)

In this case a stop signal is generated and the sewing machine is stopped. The control of the sewing machine is performed by the sewing machine control signal.

Sewing Machine Control Signal

The four bit sewing machine control data are stored in the fifth to second bits of the memory device 1. For example, the start-stop informations of the needle are stored in the fifth bit. When the read out signal is "1"

the needle is started whereas when the read out signal is "0" the needle is stopped.

In the same manner, in the fourth and third bits information regarding thread cut, stop of the needle at the upper dead center or lower dead center are stored in the form of "1" or "0". It is possible to control various functions of the sewing machine by reading these data.

Regarding the thread cut, the stop of the needle at the upper or lower dead point, the operation is proceeded to the next step after the sewing machine has produced a completion signal.

Figures 15, 16:
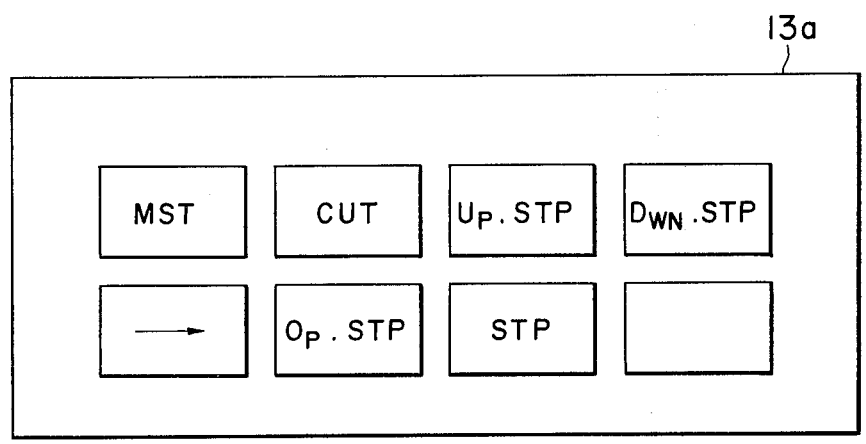
FIG. 15 is a plan view showing the control panel utilized in this invention.
FIG. 16 is a table showing the content of a sewing program.

In the case shown in FIG. 16, item 2 described above is not necessary for the type of the control and the sewing machine control signal, and the fifth bit of the control signal is used as the start signal.

FIG. 16 is a table showing the content of the program utilized to explain the following operations. This table is different from that shown in FIG. 13 in that the operation number data from the type of control to the number data are designated by one address number of P-ROM and when clearing the operation number counter 328 shown in FIG. 10 for example the content thereof is not "0" but "1" is used.

The operation of the embodiment described above will now be described with reference to FIGS. 10 and 16. In this embodiment, the pattern shown in FIG. 12 is used as a sewing pattern. A sheet 201 formed with the pattern marks is mounted on the table 111a of the coordinate reader 11a, and the sheet 201 is formed with small perforations or marks at the needle lowering positions $P_0$, $P_1$, $P_2$ . . ., shown in FIG. 12.

After positioning the stylus holder 101a (FIG. 8a) immediately above the starting point $P_0$, a clear switch, not shown, is closed to clear various counters and registers. Under these conditions, when the clear switch is closed and the various counters and registers are cleared, the address of the address counter 301 is "0" and the operation number counter 328 is set to "1". Then, the push button STP (FIG. 15) on the control panel 13a is depressed to prepare the type of control 11 (stop signal), but at this moment, it is not written in P-ROM.

At the next stage, referring to FIG. 12, the sewing operation of the straight line①parallel to Y coordinate axis and extending from the starting point to the point $P_0$ begins without driving a sewing machine. First, the holder 101a is moved along the straight line①while the operator is observing the position indicator 12a (FIG. 9) and according to this movement, pulses from the rotary encoders 104a and 105a are counted by the X axis counter 307 and the Y axis counter 308 and the counted values are indicated by the position indicator 12a thus pushing down the holder 101a at the position where the indicator indicates X = 0 mm (0 pulse) and Y = 2 mm (10 pulses). According to this operation, the switch circuit 315 (FIG. 10) operates so as to generate the timing signal TC to compare the contents of the axis counters 307 and 308 with those of the axis buffer registers 304 and 305 by means of the coincidence circuits 311 and 312. In this comparison the contents as to the X axis counters are coincident with each other (both are "0"), but those as to the Y axis counters are not coincident (Y axis counter 308: 10 pulses and Y axis buffer register 305: 0). In this case, since the straight line signal STA = 0 and $\overline{STA}$ = 1, the AND gate circuit 321 is enabled but the AND gate circuit 322 is not enabled. Therefore, the AND gate circuit 324 is also not enabled, pulses counted by the operation number counter 328 are not generated from the OR gate circuit 327 and the output keeps "0" state. For this reason, the input of the inverter 330 is "0" and the output is "1". After the generation of the timing signal TC, the reset signal R is generated and applied to the AND gate circuit 329 to enable the AND gate circuit 329 thereby generating the reset signal CR. According to the reset signal CR, the contents of the type of control, control signal, X- and Y-axis buffer registers 304, 305 and the operation number counter 328 are written in P-ROM, where the type of control "11" has been cleared. The written contents are shown by the address No. 0 in FIG. 16, and after completing the writing, one content of the address counter 301 is applied. Then, the reset signal CR resets the operation number counter 328 to "1". On the other hand, the signal R serves to transfer the contents of the axis counters 307 and 308 to the axis buffer counters 304 and 305 and to clear the axis counters 307 and 308 through the OR gate circuits 316 and 317. The reason why the data of the type of control "11" is written in the address No. 0 is that the data is utilized for the operation of the sewing machine using a P-ROM programmed by the apparatus according to this invention, and when the type of control is "11," X data, Y data and operation number data will be ignored.

In the case where the switch, not shown, is switched so that the straight line signal STA is "1" and $\overline{STA}$ is "0", the stop push button Up. STP for the needle upper dead center is depressed, and the holder 101a moves along the straight line①shown in FIG. 12 towards the point $P_0$, the comparator 318 operates, because of STA = "1", and regarding the straight line①since the content of the Y axis buffer register 305 is larger than that of the X axis buffer register. At this time, the gate circuits 325 and 323 are ready for passing the coincidence signal relating to the Y axis. Therefore, the flip-flop circuit 326 is set every time when the counts of the Y axis counter 308 and that of the Y axis buffer register 305 are coincident with each other, and simultaneously, the AND gate circuit 320 is enabled. A signal of "1" is applied to the gate circuit 323 and the output signal is generated from the gate circuit 323 slightly later than that from the gate circuit 325, thereby resetting the flip-flop circuit 326 to generate a pulse signal from the flip-flop circuit 326 which increases the count of operation number counter 328 by one through OR gate circuit 327. The output of the OR gate circuit 327 is applied to AND gate circuit 329 through the inverter 330 for preventing the generation of the reset signal CR from the AND gate circuit 329. The output of the AND gate circuit 320 is applied to the one input of the OR gate circuit 317, so that the Y axis counter 308 is cleared every time when coincidence is obtained. When the stylus holder 101a reaches the point $P_0$, since the operation number counter 328 has been increased by one for every 2 mm, the total count of counter 328 is 7. Since the straight line①terminates at the point $P_0$, the straight line signal STA becomes "0" and $\overline{STA}$ "1".

At the point $P_0$, it is required to apply the type of control "10" (optional stop). First, the stylus holder 101a is forced downwardly at the point $P_0$ to close switch circuit 315 for checking the coincidence by the coincidence circuits 311 and 312. However, both circuits do not coincide because the Y axis counter 308 has been cleared at the point $P_0$. Then, the following steps will be taken in the same manner as above described.

(1) The type of control, control signal, and the contents of X and Y axis buffer registers 304, 305 and of operation number counter 328 are written in the P-ROM. Address No. 1 in FIG. 16 shows the contents written in, that is X data is 0, Y data is −10 pulse, number data is 7 and needle upper dead center signal is "1".

(2) One is added to the count of the address counter 301, and the operation number counter 328 is reset to one.

(3) The contents of the X and Y axis counters 307 and 308 are transferred to the X and Y axis buffer registers 304 and 305, respectively, and (4) The X and Y axis counters 307 and 308 are cleared. After these steps, the optional stop/push button Op. STP is depressed and the type of control becomes "10".

Then, the stylus holder 101a is moved along the straight line ② to point $P_1$. When the holder 101a is depressed, the switch circuit 315 is closed to check the outputs of the coincidence circuits 311 and 312, but in this case too, both circuits are not coincident so that AND gate circuits 321 and 322 are not enabled and a pulse signal adapted to increase the count of the operation number counter 328 is not generated. Therefore, in this case too, the steps (1) through (4) mentioned above are carried out, so that optional stop code (10) is written in the address No. 2 shown in FIG. 2 and the type of control is cleared to "00".

A push button MST for the control signal is depressed. Then the holder 101a is moved to the point $P_2$ from $P_1$ and lowered at the point $P_2$. During the movement of from $P_0$ to $P_1$, X = 5 pulses and Y = −9 pulses are generated while during the movement of from $P_1$ to $P_2$, X = 5 pulses and Y = −8 pulses are generated, thus generating different number pulses in both cases. The reason why the number of pulses are different on the same straight line with marks having equal spacings is that the counting unit is considerably rough, i.e. 0.2 mm, and that the marking point may not take a position of multiples of the counting unit of 0.2 mm. Accordingly, in this case too, the coincidence circuits 311 and 312 are not coincident, so that it is required to carry out the steps (1) through (4) mentioned above to write the data of the address No. 3 shown in FIG. 16 in P-ROM. Then, the holder 101a is moved from the point $P_2$ to the point $P_3$ and lowered at the point $P_3$. Then, the coincidence circuits become coincident and the AND gate circuits 321, 322 and 324 and the OR gate circuit 327 are enabled. Thus, one is added to the count of the operation number counter 328 so as to increase the count to 2, and the writing in P-ROM is not carried out by means of the inverter 330 and the AND gate circuit 329.

At the next step, the stylus holder 101a is moved to the point $P_4$ and lowered. In this time, the Y axis data do not coincide, so that the steps (1) through (4) are carried out to store the data of address No. 4.

In the same manner as mentioned above, the holder 101a is successively moved to point $P_6$ through $P_5$, and at point $P_6$, the address No. 0 through No. 5 shown in FIG. 16 have been programmed.

Referring to the straight line ③ which is parallel with X axis, since only two marking points $P_7$ and $P_8$ exist, the holder 101a is positioned to these marking points and the program is prepared in the same manner as in the straight line portion ② while maintaining the straight line signal STA = "0". Of course, by maintaining STA = "1", the same result as in STA = "0" is obtained. Thus, when the holder 101a is moved to the point $P_8$ and is lower there, the address No. 6, i.e. straight line ② shown in FIG. 16 is programmed.

As the next step, programming of the straight line 4, which is parallel to the Y axis, starts.

First, the stylus holder 101a is positioned at the point P9 and lowered there. In this case, since the data between the points $P_7$ and $P_8$ and that between the points $P_8$ and $P_9$ are clearly different, the coincidence is not obtained, so that the steps (1) through (4) mentioned above are performed, the address No. 7 is programmed, and the data between the points $P_8$ and $P_9$ are set to the X axis and Y axis buffer registers 304 and 305. In this case, X = 0, and Y = 2 mm (10 pulses). Then, the straight line signal STA is made "1" and the holder 101a is moved along the straight line ④ When the holder 101a reaches the point $P_{14}$, the straight line signal STA is made "1". At that time, the count of the operation number counter 328 is advanced to 6 by the same operation as was made regarding the straight line ① The holder 101a is not lowered at the point $P_{14}$, but moved to the point $P_{15}$ and lowered there. The data between the points $P_8$ and $P_9$ are applied to the X axis and Y axis buffer registers 304 and 305 and the data between the points $P_{14}$ and $P_{15}$ are applied to the X axis and Y axis counters 307 and 308, so that in this case too, the coincidence does not hold and the steps (1) through (4) are carried out to program the address No. 8 shown in FIG. 16. The programmings as to a curve ⑤ and straight lines ⑥ and ⑦ are performed in a manner similar to that made as to the straight line ②

Regarding a straight line ⑧ after stopping the operation of the sewing machine and applying a needle upper dead center stop signal, the straight line signal STA is made to "1" and then the writing is carried out in the same manner as described as to the straight line ④

The operation relating to the curve ⑨ will be done by following the marking points successively as in the case of the straight line ② The operation relating to the straight line ⑩, in which spacings between marking points are small, will be carried out in a manner similar to that of the straight line ④ The operation relating to the final straight line ⑪ is performed by stopping the operation of the sewing machine, cutting the thread, stopping the needle at the needle upper dead center and returning to the starting point STP. However, it is not necessary to exactly program the data of the straight line ⑪ different from the case where the data of the portions shown by the solid lines to be sewed is programmed, and it is only necessary to exactly return the holder 101a from the last marking point on the straight line ⑩ to the starting point ST.P. Accordingly, the programming of the line ⑪ is made so as to move the holder 101a from the last marking point on the line ⑩ nearly along the line ⑪ while observing the position indicator 12a (FIG. 9). In other words, the holder 101a is stopped at the position where X = −1.6 mm (8 pulses) and Y = 3 mm (15 pulses) and is lowered at the position. In this case, since the coincidence circuits 311 and 312 do not coincide, the data of the straight line ⑩ is written as shown in the address No. 29 in FIG. 16.

Then, push buttons for thread cutting and needle upper dead center are depressed (FIG. 15) and the straight line signal STA is made to be "1". The holder 101a moves towards the starting point ST.P along the straight line ⑪ and during this step the comparator 318 indicates the fact that the output of the Y axis buffer register 305 is larger than that of the X axis buffer register 304, so that the output of the Y axis coincidence circuit 312 is applied to the gate circuits 325 and 323 and the count of the operation number counter 328 successively increases one by one each time a coincidence signal is supplied. Then the operator finds out a position near the starting point showing that the amount of movement of an integer multiple of X = −1.6 mm and Y = 3 mm by observing the position indicator 12a and makes the straight line signal STA to "0". Thereafter, the holder 101a is moved to the starting point ST.P and lowered. At this time, since the coincidence circuits 311 and 312 do not coincide with each other, the steps (1) through (4) mentioned hereinbefore are carried out and the data shown in the address No. 30 in FIG. 16 is written in P-ROM. Then, the operation number data shows "8".

At the next stage, the stylus holder 101a is lowered again at the starting point ST.P. At this time, the X axis and Y axis buffer registers 304 and 305 store the remaining part of the data of the straight line ⑪ and the counts of the X axis counter 307 and the Y axis counter are "0" respectively. Therefore, since the coincidence circuits 311 and 312 are not coincident with each other, the steps (1) through (4) are performed and the data of the address No. 31 is written. Since it is necessary to apply a stop signal at the starting point ST.P, the stop button ST.P. (FIG. 15) is depressed and the type of control is changed to "11". Then, under the condition as "0" has been applied to the X axis and Y axis buffer registers 304 and 305, the holder 101a moves from the starting point ST.P, the data (any value other than "0") is applied to the X axis and Y axis counters 307 and 308, and the holder 101a is lowered. In this case, since the data of the X axis and Y axis counters 307 and 308 and that of the buffer registers 304 and 305 are not coincident with each other, the steps (1) through (4) are also performed and program in the address No. 32 shown in FIG. 16.

Although all the programs of the sewing pattern shown in FIG. 12 have been explained hereinabove, from these explanations, it will be understood that the programming of the straight line portions can be carried out extremely easier by the use of the operation number data than the case of one stitch sewing program and the capacity of P-ROM can be reduced, thereby enabling one to easily prepare a program of a complicated sewing pattern and a sewing pattern having a lot of marking points.

As above described, a low cost memory writer can be used instead of an expensive program processor including a micro-computer. In addition, according to this invention, a program is stored by merely positioning a stylus on the marked positions which are arranged according to a desired sewing pattern and the operation of the stylus is possible when the operator operates a pedal or a push button switch provided for the coordinate reader.

Figure 17:
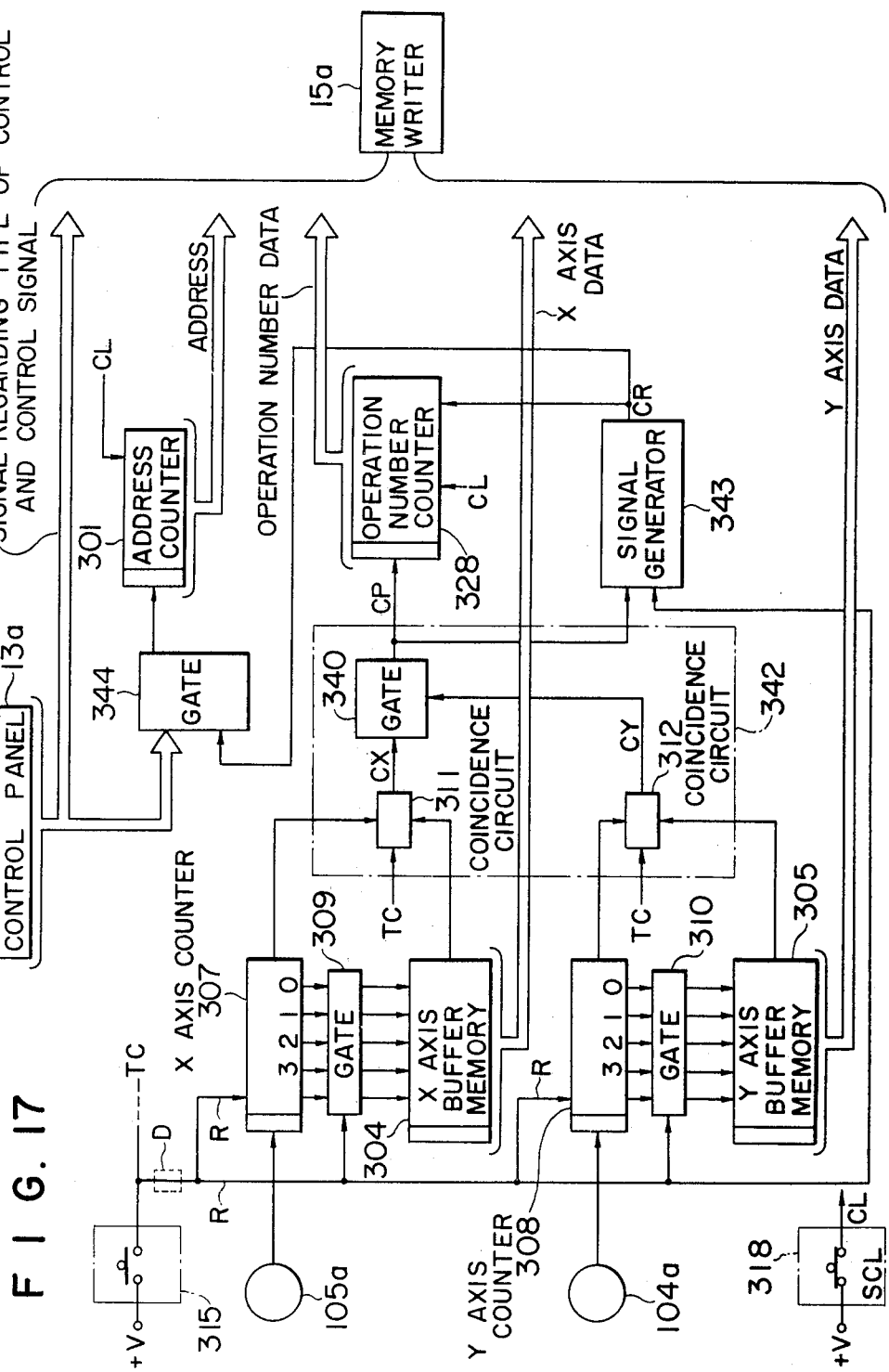
FIG. 17 is a modification of the programming system shown in FIG. 10.

A modified embodiment shown in FIG. 17 is different from the embodiment shown in FIG. 16 in the following points. More particularly, FIG. 17 shows a modification of the programming system shown in FIG. 10 under the condition of $\overline{STA} = 1$ and STA = 0. Thus, in the circuit shown in FIG. 17, since it is necessary to carry out the programming operation at every marking position of the straight line portion of the sewing pattern, the comparator 318, gate circuits 323 and 325, and flip-flop circuit 326 shown in FIG. 10 are not provided. Thus, the outputs of both coincidence circuits 311 and 312 are applied to a gate circuit 340 which produces a pulse signal CP which is applied to the operation number counter 328 as a counting pulse when coincidences hold in both coincidence circuits. Elements 311, 312 and 340 bounded by dash and dot lines constitute an input gate circuit 342 for the operation number counter 328. A signal generator 343 produces a signal CR which resets the operation number counter 328 when the reset signal R is applied but the signal CP produced by the input gate circuit 342 is not applied. Signal CR is also applied to a gate circuit 344 for applying an input to the address counter 301. The gate circuit 344 is also connected to receive a two bit signal representing the type of control and a four bit sewing machine control signal from the control panel 13a in addition to signal CR so that the address counter 301 operates in accordance with a change in these signals. Thus, signal generator 343 and gate circuit 344 constitutes an address condition gate circuit for the address counter 301.

A clear signal generator 318 including a switch SCL is provided for applying a clear signal CL to the address counter 301 and the other counters.

The modified embodiment shown in FIG. 17 operates in the same manner as the first embodiment. The modification shown in FIG. 17 differs from the first embodiment in that even at the straight line portion of the sewing pattern it is necessary to position the stylus holder 101a at every mark as above described. However, the circuit construction is simpler.

Although the movement of the stylus holder for the programming operation is different in FIGS. 10 and 17, the contents stored in the programing memory devices are the same.

I claim:
1. In a programming system for an automatic sewing machine of the type comprising a memory device provided with a plurality of addresses corresponding to respective steps of the sewing operation of said sewing machine, said addresses being used to store sewing machine driving signals corresponding to respective addresses and means for storing a sewing command program in said memory device, the improvement which comprises:
   a sewing pattern sheet provided with marks corresponding to needle lowering positions of a predetermined sewing profile;
   a coordinate reader including a stylus movable on said sheet to a selected mark, and an X axis and a Y axis counter for representing the X and Y coordinates respectively of said stylus at said selected mark;
   an axis buffer register and a Y axis buffer register;
   switch means for producing a reset signal which is used to set the contents of said X and Y axis counters respectively in said X and Y axis buffer registers and to reset said X and Y counters when said stylus is positioned on said selected mark, said X and Y axis buffer registers holding the set values until said stylus is moved to a succeeding mark;
   an operation number counter which counts the number of the successive marks positioned along a straight line which constitutes a portion of the sewing pattern profile;
   gate circuit means for producing a counting signal supplied to said operation number counter, said gate circuit means including coincidence circuits for detecting coincidence of the content of said X axis counter with that of said X axis buffer register and coincidence of the content of said Y axis counter with that of said Y axis buffer register;

a control panel for producing a signal regarding the type of the sewing machine control and a sewing machine control signal;

an address counter which advances its count in response to a reset signal for said operation number counter, for the signal regarding the type of control and for the sewing machine control signal; and a memory writer for storing said signal regarding the type of the sewing machine control, said sewing machine control signal, and bit values of said X and Y axis buffer registers and of said operation number counter in a memory region corresponding to an address in said memory device designated by said address counter.

2. The programming system according to claim 1 wherein said stylus comprises a needle and said system further comprises means for reciprocating said needle through said sheet thereby forming said marks and means responsive to the reciprocation of said needle for operating said switch means.

3. The programming system according to claim 1 wherein said marks comprise perforations through said sheet and said stylus comprises a pneumatic micrometer having a nozzle for ejecting compressed gas into said perforations.

4. The programming system according to claim 1 wherein said marks comprise black spots on the surface of said sheet and said stylus comprises a photodetector which detects light reflected by said black spots.

5. The programming system according to claim 1 wherein said marks comprise magnetized spots formed on the surface of said sheet and said stylus comprises a magnetic head for magnetically detecting said magnetized spots.

6. The programming system according to claim 1 wherein said gate circuit means includes a comparator for comparing the content of said X axis buffer register with that of said Y axis buffer register to produce a command signal supplied to said gate circuits so as to select the output of one of said X axis and Y axis coincidence circuits, said selected output being applied to said gate circuits which produces a counting signal applied to said operation number counter under the condition of straight line signal STA = 1.

* * * * *